US011138463B1

(12) United States Patent
Wang et al.

(10) Patent No.: US 11,138,463 B1
(45) Date of Patent: Oct. 5, 2021

(54) UNSUPERVISED AND SUPERVISED MACHINE LEARNING APPROACHES TO DETECTING BOTS AND OTHER TYPES OF BROWSERS

(71) Applicant: Shape Security, Inc., Mountain View, CA (US)

(72) Inventors: Xinran Wang, San Ramon, CA (US); Yao Zhao, Fremont, CA (US)

(73) Assignee: SHAPE SECURITY, INC., Santa Clara, CA (US)

( * ) Notice: Subject to any disclaimer, the term of this patent is extended or adjusted under 35 U.S.C. 154(b) by 373 days.

(21) Appl. No.: 15/669,618

(22) Filed: Aug. 4, 2017

Related U.S. Application Data

(60) Provisional application No. 62/371,667, filed on Aug. 5, 2016.

(51) Int. Cl.
*G06F 16/20* (2019.01)
*G06K 9/62* (2006.01)
(Continued)

(52) U.S. Cl.
CPC ......... *G06K 9/6223* (2013.01); *G06F 16/353* (2019.01); *G06K 9/626* (2013.01); *G06N 5/025* (2013.01); *G06N 20/00* (2019.01)

(58) Field of Classification Search
None
See application file for complete search history.

(56) References Cited

U.S. PATENT DOCUMENTS

2013/0185643 A1* 7/2013 Greifeneder ............ H04L 67/22 715/736
2015/0381376 A1* 12/2015 Wardman ............. H04L 9/3271 726/25

(Continued)

OTHER PUBLICATIONS

CTNF, mailed on Jul. 18, 2019, re: Xinran Wang, U.S. Appl. No. 15/669,618, filed Aug. 4, 2017.

*Primary Examiner* — Belix M Ortiz Ditren
(74) *Attorney, Agent, or Firm* — Troutman Pepper Hamilton Sanders LLP (Rochester)

(57) ABSTRACT

Unsupervised or supervised machine learning ("ML") techniques discussed herein can be used to classify browsers as one or more types of browser or within one or more browser groups. For example, a computer system configured to improve security of server computers interacting with client computers through an intermediary computer, and comprising: a memory comprising processor logic; one or more processors coupled to the memory, wherein the one or more processors execute the processor logic, which causes the one or more processors to: receive a first plurality of requests from a first plurality of browsers; generate a first plurality of request-feature vectors from the first plurality of requests; generate a plurality of browser groups based on the first plurality of request-feature vectors; receive a first new request from a first client computer; generate a first new request-feature vector based on the first new request; determine that the first new request-feature vector belongs to a first browser group among the plurality of browser groups; determine that the first browser group is associated with a first rule, and in response, respond to the first new request according to the first rule.

20 Claims, 7 Drawing Sheets

(51) Int. Cl.
*G06N 5/02* (2006.01)
*G06F 16/35* (2019.01)
*G06N 20/00* (2019.01)

(56) References Cited

U.S. PATENT DOCUMENTS

2016/0117736 A1* 4/2016 Dasdan ................. H04L 67/306
705/14.66
2016/0191554 A1* 6/2016 Kaminsky ........... H04L 63/1416
726/23
2017/0070484 A1* 3/2017 Kruse ....................... H04L 9/30
2019/0166141 A1 5/2019 Xu et al.

* cited by examiner

FIG. 4

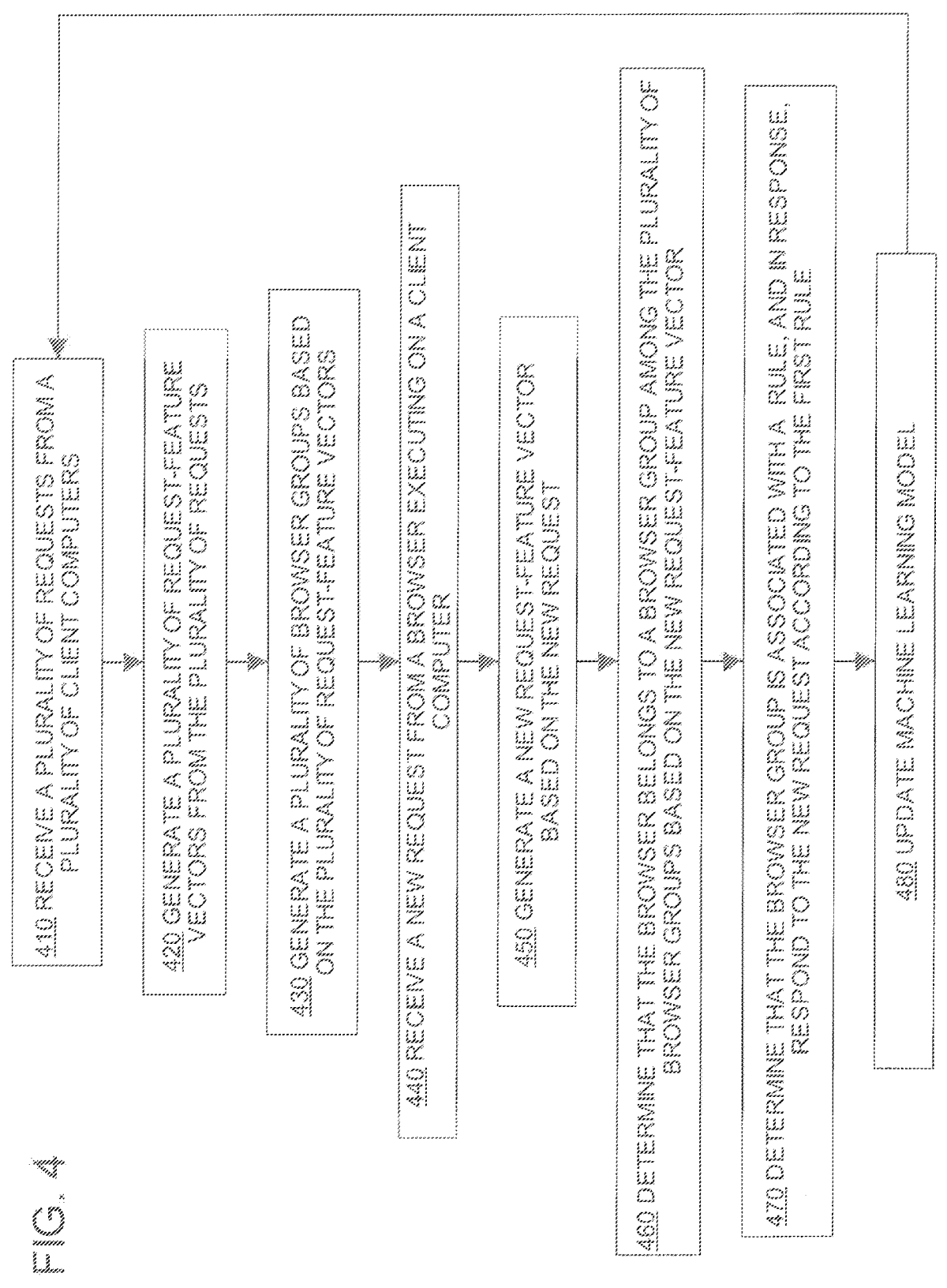

410 RECEIVE A PLURALITY OF REQUESTS FROM A PLURALITY OF CLIENT COMPUTERS

420 GENERATE A PLURALITY OF REQUEST-FEATURE VECTORS FROM THE PLURALITY OF REQUESTS

430 GENERATE A PLURALITY OF BROWSER GROUPS BASED ON THE PLURALITY OF REQUEST-FEATURE VECTORS

440 RECEIVE A NEW REQUEST FROM A BROWSER EXECUTING ON A CLIENT COMPUTER

450 GENERATE A NEW REQUEST-FEATURE VECTOR BASED ON THE NEW REQUEST

460 DETERMINE THAT THE BROWSER BELONGS TO A BROWSER GROUP AMONG THE PLURALITY OF BROWSER GROUPS BASED ON THE NEW REQUEST-FEATURE VECTOR

470 DETERMINE THAT THE BROWSER GROUP IS ASSOCIATED WITH A RULE, AND IN RESPONSE, RESPOND TO THE NEW REQUEST ACCORDING TO THE FIRST RULE

480 UPDATE MACHINE LEARNING MODEL

DISPLAY 712
INPUT DEVICE 714
CURSOR CONTROL 716
MAIN MEMORY 706
ROM 708
STORAGE DEVICE 710
BUS
702
PROCESSOR 704
COMMUNICATION INTERFACE 718
700
SERVER 730
728
INTERNET
ISP
726
NETWORK LINK
720
LOCAL NETWORK 722
HOST 724

UNSUPERVISED AND SUPERVISED MACHINE LEARNING APPROACHES TO DETECTING BOTS AND OTHER TYPES OF BROWSERS

BENEFIT CLAIM

This application claims the benefit under 35 U.S.C. 119(e) of provisional application 62/371,667, filed Aug. 5, 2016, the entire contents of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE

The present disclosure generally relates to security techniques applicable to client/server systems, and relates more specifically to using unsupervised and supervised machine learning approaches to generating a machine learning model to classify a browser that sent a request into one or more browser groups and apply one or more rules to the request.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Browsers are powerful computer program applications that may request and execute instructions received from a web server to generate complex user interfaces that are presented to a user through one or more devices, such as a monitor or speakers. In response to input from a user indicating that the user selected an object defined in the instructions, a browser may send a request based on the selected object to the web server. The request may be a request for data or include data to be processed by the web server. For example, a browser may present a web page from a web server that defines a form, a user may enter data into one or more fields in the form, select a submit button. In response the browser may generate request that includes the data entered into the one or more fields, and send the request to the web server.

Attackers may use software, often referred to as a "bot" or "headless browser", which imitates a browser and a user by receiving instructions from a web server and autonomously generating requests based on those instructions. For example, a bot may receive a web page, gather data in one or more objects defined in the web page, and generate a request for another web page to gather additional data, as if a user using a browser was requesting a new web page. Also for example, a bot may generate and send a request with data assigned to one or more parameters that correspond to fields in a web page to simulate a user submitting data to a web server through a browser.

Attackers may use bots to commit many types of unauthorized acts, crimes or computer fraud, such as web site or content scraping, ratings manipulation, fake account creation, reserving rival goods attacks, ballot stuffing attacks, password snooping, vulnerability assessments, brute force attacks, click fraud, DDoS attacks, bidding wars, and system fingerprinting attacks. As a specific example, a malicious user may cause a bot to traverse through pages of a web site and collect private or proprietary data, such as who is connected with whom on a particular social networking web site.

Web server administrators may wish to prevent malicious users from attacking the site, while allowing legitimate users to use the site as intended. However, determining which requests are generated by a legitimate user using a web browser and a malicious user using a bot may be difficult.

SUMMARY

The appended claims may serve as a summary of the invention.

BRIEF DESCRIPTION OF THE DRAWINGS

In the drawings:

FIG. 4 illustrates a process for generating and using a request-feature vector based ML model based on a plurality of requests from a plurality of browsers, in an example embodiment.

Figure 1:
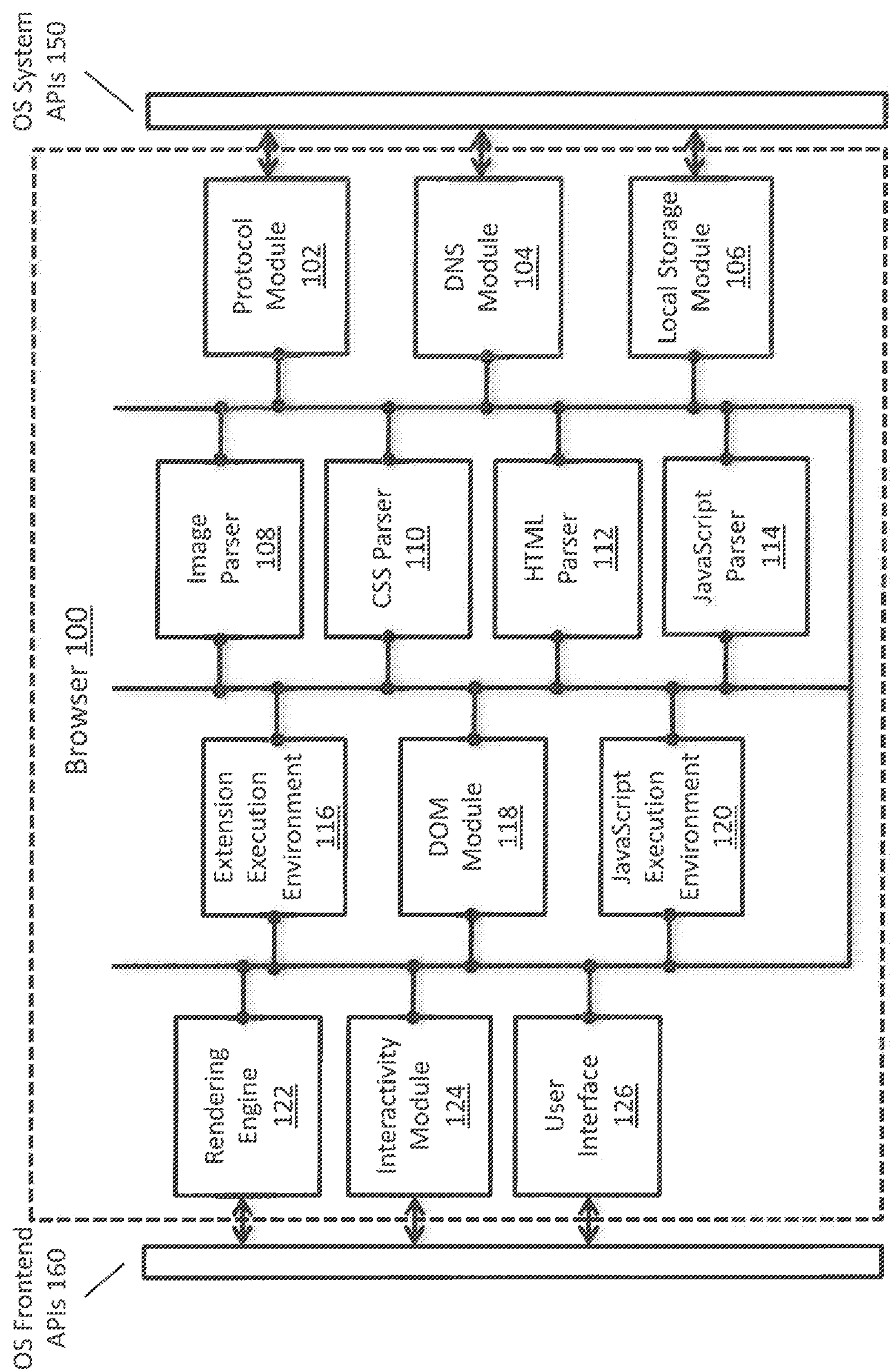
FIG. 1 illustrates functional units of a web browser in an example embodiment.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures, but using the particular arrangement illustrated in the one or more other figures is not required in other embodiments. For example, intermediary computer 230 in FIG. 2 may be described with reference to several components illustrated in FIG. 3 and discussed in detail below, but using the particular arrangement illustrated in FIG. 3 is not required in other embodiments. Furthermore, while the instructions discussed in many example embodiments are HyperText Markup Language ("HTML") and JavaScript instructions, in other embodiments, the instructions received and generated may be any other standard or proprietary instructions configured to be executed by a client computer.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Words, such as "or", may be inclusive or exclusive unless expressly stated otherwise; a "set" may comprise zero, one, or two or more elements. For example, a set of instructions may comprise one or more instructions. One or more of a first set of objects or a second set of objects may be one or more of the first set of objects or one or more of the second set of objects.

Embodiments are described herein according to the following outline:

1.0 General Overview
2.0 Browsers, Bots, and Attacks
2.1 Example Browser Anatomy
2.2 Example Bot or "Headless Browser" Anatomy
2.3 Identifying a Browser
2.4 Implicitly Identifying a Browser
2.5 Example Detection Tests
3.0 Example Network Topology for Identifying a Responding to Browsers
3.1 Web Infrastructure
3.2 Intermediary computer
3.2.1 Protocol Client Logic
3.2.2 Processing Logic
3.2.3 Injection Logic
3.2.4 Protocol Server Logic
3.2.5 Browser Group Classification Logic
3.2.6 Request Processor Logic
3.2.7 Configurations
3.2.8 Storage
3.3 Browser
4.0 Process Overview
4.1 Generating a Plurality of Browser Groups
4.1.1 Representing browsers using Request-Feature Vectors
4.1.2 Identifying Browser Clusters
4.1.3 Associating Browser Groups with Clusters
4.2 Classifying a New Browser into a Browser Group based on a New Request
4.3 Executing one or more Rules Associated with one or more Browser Groups
4.4 Updating the Machine Learning Model
4.4.1 Regenerating the Machine Learning Model
4.4.2 Generating Cluster-Feature Vectors
4.4.3 Generating a Cluster-Feature Vector Based Machine Learning Model
4.4.4 Applying the Cluster-Feature Vector based Machine Learning Model to a New Set of Clusters
5.0 Implementation Mechanisms—Hardware Overview
6.0 Other Aspects of Disclosure

1.0 General Overview

Unsupervised or supervised machine learning ("ML") techniques discussed herein can be used to classify browsers as one or more types of browser or within one or more browser groups. In response to determining that a browser is a particular type of browser or within a particular browser group, a server computer can respond to requests from the browser based on rules associated with the particular type of browser or browser group. The server computer may update one or more ML models over time.

In an embodiment, a computer system configured to improve security of server computers interacting with client computers through an intermediary computer, and comprising: a memory comprising processor logic; one or more processors coupled to the memory, wherein the one or more processors execute the processor logic, which causes the one or more processors to: receive a first plurality of requests from a first plurality of browsers; generate a first plurality of request-feature vectors from the first plurality of requests; generate a plurality of browser groups based on the first plurality of request-feature vectors; receive a first new request from a first client computer; generate a first new request-feature vector based on the first new request; determine that the first new request-feature vector belongs to a first browser group among the plurality of browser groups; determine that the first browser group is associated with a first rule, and in response, respond to the first new request according to the first rule.

In an embodiment, the processor logic further causes the one or more processors to: receive a second new request from a second client computer; generate a second new request-feature vector based on the second new request; determine that the second new request-feature vector belongs to a second browser group among the plurality of browser groups, wherein the second browser group is different than the first browser group; determine that the second browser group is associated with a second rule, and in response, respond to the second new request according to the second rule; wherein the second rule is different than the first rule.

In an embodiment, the processor logic further causes the one or more processors to: partition the first plurality of request-feature vectors into a first plurality of clusters; associate, for each cluster among the first plurality of clusters, the cluster to at least one browser group among the plurality of browser groups.

In an embodiment, the processor logic further causes the one or more processors to: generate a cluster-feature vector machine learning model based on each cluster in the first plurality of clusters, one or more browser groups associated with the cluster, and a cluster-feature vector based on the cluster; generate a second plurality of request-feature vectors based on a plurality of second requests from a second plurality of browsers; identify a second plurality of clusters based on the first plurality of request-feature vectors and the second plurality of request-feature vectors; determine, for each cluster in the second plurality of clusters, based on the cluster-feature vector machine learning model and the cluster, whether each browser group in the plurality of browser groups should be associated with the cluster, and if so, associate the browser group with the cluster.

In an embodiment, a method comprises: receiving a first plurality of requests from a first plurality of browsers; generating a first plurality of request-feature vectors from the first plurality of requests; generating a plurality of browser groups based on the first plurality of request-feature vectors; receiving a first new request from a first client computer; generating a first new request-feature vector based on the first new request; determining that the first new request-feature vector belongs to a first browser group among the plurality of browser groups; determining that the first browser group is associated with a first rule, and in response, responding to the first new request according to the first rule; wherein the method is performed by one or more processors.

A "computer" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" herein may mean one or more computers, unless expressly stated otherwise.

2.0 Browsers, Bots, and Attacks

A web browser may be a tool through which server-based application programs can provide client computers with content in a dynamic, custom UI. For example, in response to receiving a request for data from a web browser, a server computer may respond with a set of instructions that define one or more objects with one or more object identifiers. The instructions may use the object identifiers to define how objects may be presented in a UI to enable human/computer interaction.

In contrast, bots traverse web pages or web sites to retrieve data from, or submit data to, one or more server computers with little, if any, human/computer interaction. For example, in response to receiving a request for data from a bot, a server computer may respond with a set of instructions. A bot may parse the instructions to collect data from, or to store data in, particular objects with particular object identifiers. A bot may also make requests based on an object identifier, such as the identifier for a text field input. However, unlike a browser, a bot need not execute the instructions that define how objects should be presented in a UI because the bot is built to operate with little, if any, human/computer interaction. Thus, a bot may be a For convenience of expression, a set of instructions may be referred to herein as a file or web page. A set of instructions, file, or web page need not have a particular type or extension, and need not be stored in persistent storage. Furthermore, a web page may comprise one or more files, each of which include one or more instructions for a browser to process or execute. While some files may be identified as a particular type of file or having a particular set of instructions, such as an "HTML file" or "JavaScript file", a file may include mixed content. For example, an HTML file may include HTML, JavaScript, Cascading Style Sheets ("CSS"), or any other standard or proprietary set of instructions. Furthermore, a file or web page need not be a file stored in persistent storage. A file or web page may be generated dynamically based on the one or more parameters in a request for the web page, data persistently stored in a database, or one or more parameters or configurations.

2.1 Example Browser Anatomy

FIG. 1 illustrates functional units of a web browser in an example embodiment. Browser 100 may be a browser that is executed on a personal computer, used to communicate with or otherwise conceptually visit a server computer, and operated by a user using the personal computer. Browser 100 is communicatively coupled with operating system ("OS") system application programming interface ("API") layer 150 and OS frontend API layer 160. Other embodiments may use other protocols, modules, or parsers.

Browser 100 comprises protocol module 102, domain name server ("DNS") module 104, local storage module 106, image parser 108, CSS parser 110, HTML parser 112, JavaScript parser 114, extension execution environment 116, document object model ("DOM") module 118, and JavaScript execution environment 120. Protocol module 102, DNS module 104, and local storage module 106 may send or receive data through OS System API layer 150. For example, protocol module 102 may send or receive data over any protocol, such as HTTP, to/from a server computer through OS system API layer 150. Data received through protocol module 102 may reference data sources by one or more domain names. DNS module 104 may resolve the one or more domain names referenced by interfacing with one or more remote domain name servers through OS system API layer 150. Local storage module may store or recall data from memory through OS system API layer 150.

Image parser 108, CSS Parser 110, HTML parser 112, and JavaScript parser 114 may parse data received through protocol module 102. HTML parser 112 may parse HTML data. CSS parser 110 may parse CSS data. JavaScript parser 114 may parse JavaScript data. Image parser 108 may parse image data. Each parser may generate or update objects in a DOM maintained by DOM module 118.

Browser 100 may comprise sets of program logic implementing one or more programmable engines, such as extension execution environment 116 and JavaScript execution environment 120. Extensions may be written one or more programming languages include JavaScript, Python, Ruby, or any other language. Each programmable engine may have access to DOM module 118 and may operate on one or more objects from a DOM maintained by DOM module 118. For example, JavaScript execution environment 120 may execute JavaScript parsed by JavaScript parser 114 and in response, create, update, or delete one or more objects managed by DOM module 118, or one or more aspects of a UI presenting the one or more objects.

Browser 100 comprises rendering engine 122, interactivity module 124, and user interface 126. Each of the components may cause, through OS frontend API layer 160, one or more objects to be presented to a user using a client computer. Rendering engine 122 may determine how objects are presented to a user. For example, rendering engine 122 may determine the color, shape, orientation, position, or any other visual or audio attribute of an image, text field, button, or any other object defined by a set of received instructions. Furthermore, rendering engine 122 may cause a button to be displayed on a monitor coupled to a client computer through OS frontend API layer 160. Because an execution environment is a component of a browser, "browser" or "execution environment" may be used interchangeably herein.

User interface 126 may determine what may be presented to a user. For example, user interface 126 may determine that a "submit" button should be hidden until data has been entered in one or more text fields. After data has been entered in the one or more text fields, user interface 126 may notify rendering engine 122 to render the "submit" button accordingly.

Interactivity module 124 may receive one or more inputs through OS Frontend API layer 160. For example, in response to a user pressing a button on a mouse coupled to a client computer 299, the OS running on the client computer may send a message to interactivity module 124, through OS frontend API layer 160, to indicate that a user pressed a button on a mouse. Interactivity module 124 may determine that a user selected a particular button currently presented on a monitor. Interactively module 124 may notify user interface 126 or rendering engine 122 to update to update the UI accordingly. For convenience of expression, a browser operated by a legitimate user may be referred to herein as a legitimate browser.

2.2 Example Bot or "Headless Browser" Anatomy

A bot or "headless browser" may be a type of browser that includes a subset of the modules or features included in a browser used by a legitimate user, such as browser 100. For example, a bot may include protocol module 102, DNS module 104, local storage module 106, and HTML parser 112. A bot need not support a UI; thus, a bot need not include rendering engine 122, interactivity module 124, and user interface 126.

Less sophisticated bots need not include one or more parsers or execution environments. For example, a bot may be configured to look for data embedded in a DOM defined in one or more HTML documents. Accordingly, a bot may include an HTML parser, but need not include one or more parsers or execution environments, such as image parser 108, CSS parser 110, JavaScript parser 114, extension execution environment 116, or JavaScript execution environment 120.

More sophisticated bots may include one or more parsers or execution environments. For example, a more sophisticated bot may include a JavaScript engine or execution environment, such as JavaScript Execution Environment 120, which may be a run-time environment that executes JavaScript received from a server computer.

2.3 Identifying a Browser

Some protocols, such as HTTP, allow for browsers to identify themselves in a request to a server computer. For example, a browser may include, in a request to a server computer, a header with an attribute called "user-agent". The value associated with the "user-agent" attribute may identify the browser sending the request. Ideally, a server computer can determine the identify of a browser sending a request based on the user-agent attribute in the request, and respond accordingly. However, a malicious bot may spoof its identity by using the same value for the "user-agent" attribute as a legitimate browser.

2.4 Implicitly Identifying a Browser

Some browsers may include one or more of the functional units discussed herein, each browser or bot may implement the functional units differently. Some browsers may include different versions of one or more functional units. Accordingly, execution environments in different browsers may a have a different internal state after parsing or executing the same instructions in the same web page. For example, after parsing or executing the same instructions, different execution environments may create different internal names for variables, objects, or functions.

One or more instructions may be included in a web page, which when executed by a browser (or execution environment in a browser), cause the browser to generate output that describes the internal state of the browser. Since the internal state of the browser may be different for each browser, the output may be different for each browser. For convenience of expression, "detection instructions" or "browser detection instructions" may be one or more instructions that when executed by a browser cause the browser to generate output that can be used to identify or classify the browser. A "detection test", or "browser detection test", may comprise detection instructions. Accordingly, including a detection test in a web page or set of instructions may mean including detection instructions in a web page or set of instructions.

Detection instructions may cause a browser to send, to a server computer, the results from one or more browser detection tests in one or more requests for additional data, such as a request for a different web page. Additionally, or alternatively, detection instructions may cause a browser to send the results from one or more browser detection tests separately or asynchronously with one or more requests from the browser for additional data.

By comparing data generated by a browser with data generated from one or more other browsers that have executed the same set of detection instructions, a server computer may identify the browser. For example, a server computer may persistently store a repository of expected outputs from browsers that are legitimate or a repository of expected outputs from known bots. A server computer may receive output from a browser, and compare the received output to the repository of expected outputs from browsers, wherein each expected output is associated with a browser. If the received output matches a particular output in the repository of expected outputs, then the server computer may determine that the browser is the particular browser associated with the particular output. Identifying a browser may include determining that a browser is not a particular browser. For example, a browser that generates an output may be identified as not a particular browser because the output does not match any of the stored expected outputs.

2.5 Example Detection Tests

There are many ways to cause a browser to generate data that can be used to identify a browser or type of browser. For example, a set of detection instructions may cause a browser, or execution environment in a browser, to generate or raise an error. In response to raising the error, the browser may generate data indicating that an error occurred and the point within the source code that the error occurred. However, the data generated by the browser can be different than the data generated by another browser executing the same source code. For example, a first browser may generate a text string with a first error message explaining that an error occurred. A second browser may generate a text string with a second, different error message that indicates that the error occurred. A third browser may be a type of browser that generates an array of text strings, a first text string in the array could contain an error message, and the second text string could describe the current call stack when the error occurred. A fourth browser may not execute the code because it is a simple bot, and accordingly, the fourth browser need not generate any output or response related to the error. A fifth browser may execute the code, but need not generate any output or response related to the error, because it is a more advance bot, but programmed to ignore one or more errors.

A set of detection instructions may cause a browser to generate a stack trace. A stack trace identifies one or more functions that were called leading up to a particular instruction that is about to, is currently, or has recently been executed in a particular function. For example, when an error occurs, or in response to an instruction requesting a stack trace, a browser may generate or return a stack trace. There are many ways a stack trace may be represented or returned. Each browser may generate stack traces differently. Even if two browsers both generate stack traces that are text strings, the text strings may be different. Accordingly, a browser, or type of browser, can be identified based on the how the browser represents a stack trace.

3.0 Example Network Topology for Identifying a Responding to Browsers

Figure 2:
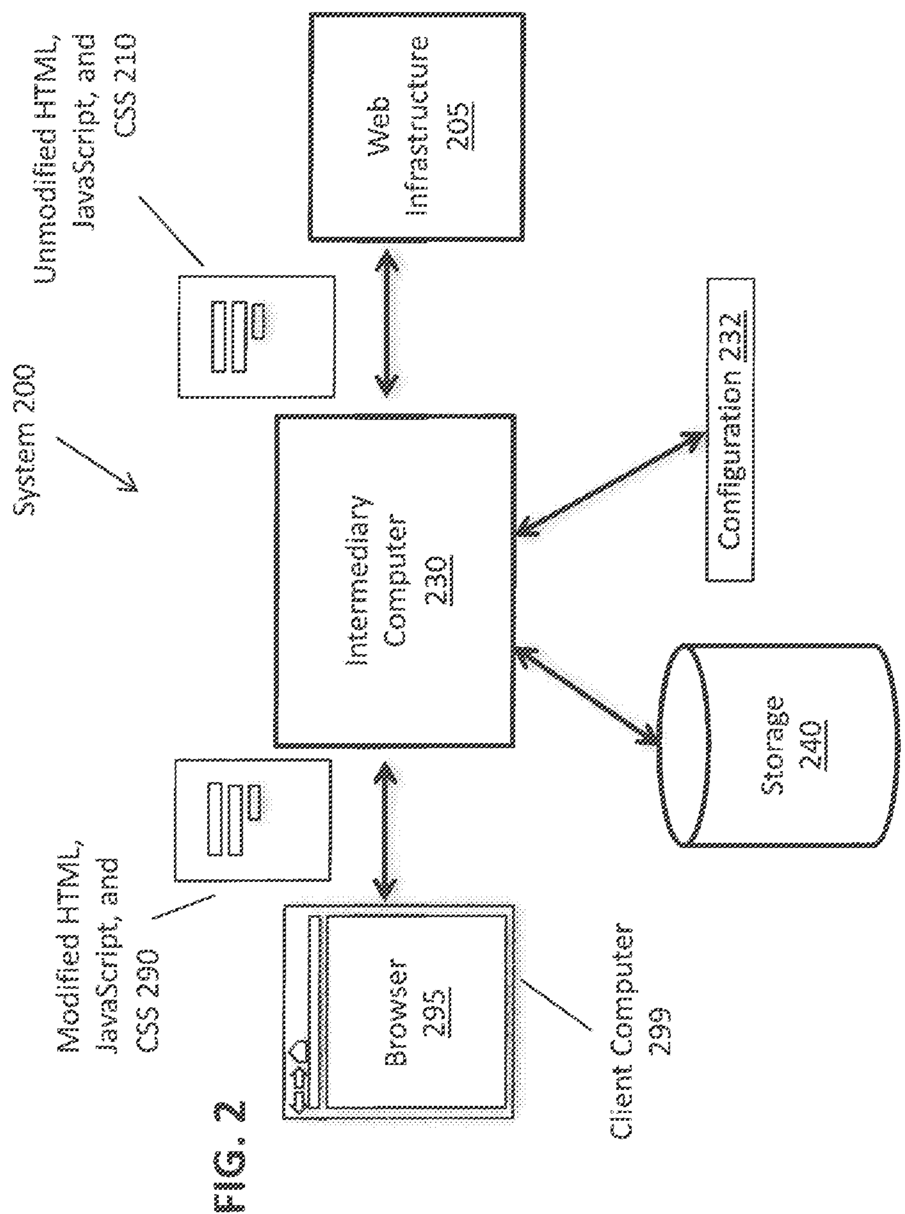
FIG. 2 illustrates a computer system comprising a browser, an intermediary computer, and a web infrastructure in an example embodiment.
Figure 3:
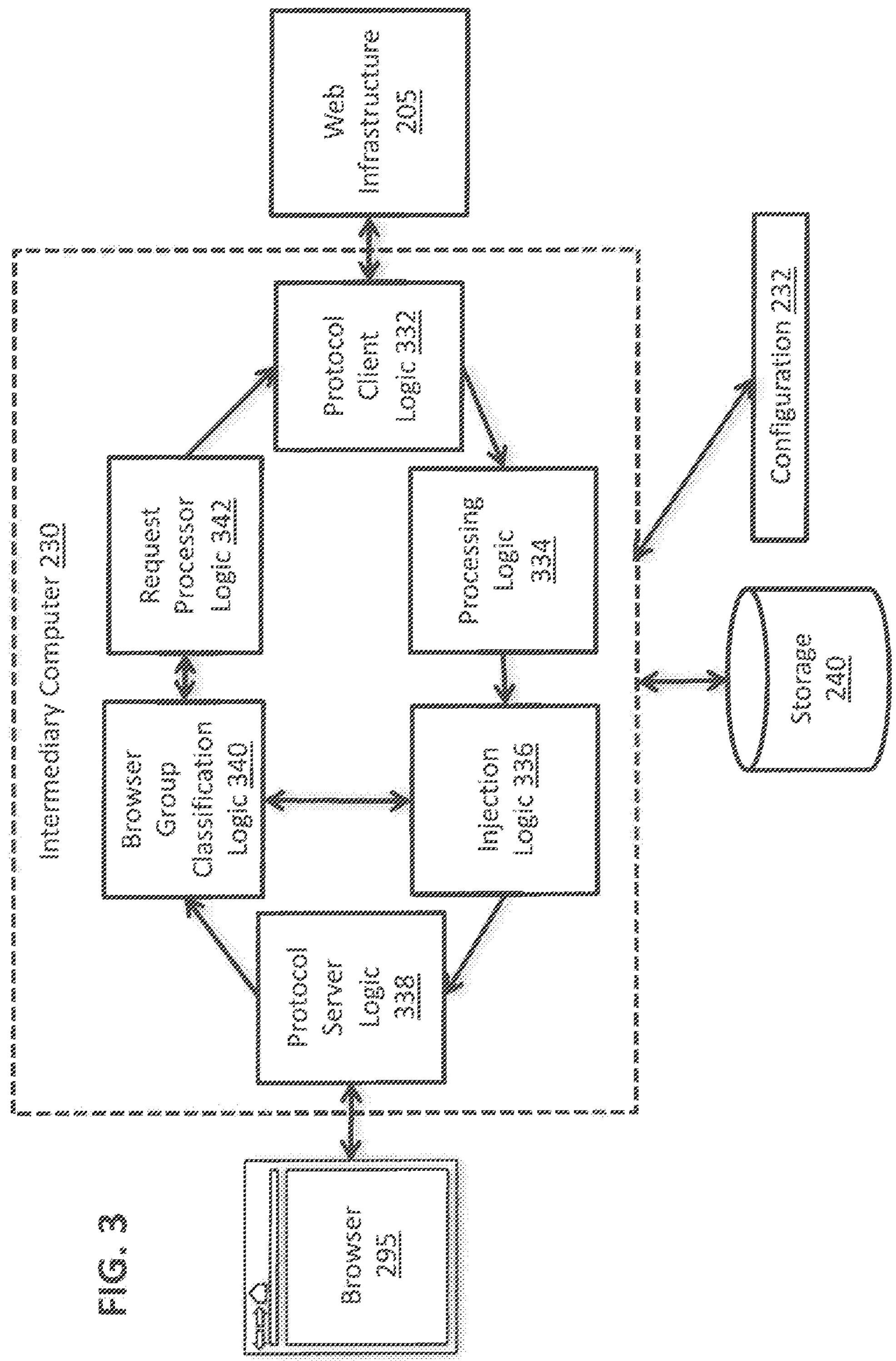
FIG. 3 illustrates a detailed view of an intermediary computer in an example embodiment.

FIG. 2 illustrates a computer system comprising a browser, an intermediary computer, and a web infrastructure in an example embodiment. In FIG. 2, system 200 includes web infrastructure 205, client computer 299, intermediary computer 230, storage 240, and configuration 232 distributed across a plurality of interconnected networks.

While each of the components listed above is illustrated as if running on a separate, remote computer from each other, one or more of the components listed above may be part of or executed on the same computer. For example, intermediary computer 230, configuration 232, storage 240, or web infrastructure 205 may be executed on the same computer, local area, or wide area network. Additionally, or alternatively, intermediary computer 230 may be a proxy server or layer for web infrastructure 205. Additionally, or alternatively, intermediary computer 230 may be in line between a router and web infrastructure 205, such that intermediary computer 230 may receive or intercept all network data sent to, or sent from, web infrastructure 205 over one or more protocols. Additionally, or alternatively, intermediary computer 230, or one or more modules comprising intermediary computer 230 discussed herein, may be a software layer between, or executed on, web infrastructure 205 or a component of web infrastructure 205. Additionally, or alternatively, intermediary computer 230, or one or more modules comprising intermediary computer 230 discussed herein, may be part of a server-side application that responds to requests over one or more standard or proprietary protocols, such as HTTP or any other protocol.

3.1 Web Infrastructure

Web infrastructure 205 may comprise one or more server computers that receive requests for data from users through one or more computers, such as client computer 299 or intermediary computer 230. Web infrastructure 205 may respond by sending data to the browser that sent the request. As illustrated in FIG. 2, the data sent from web infrastructure 205 may include instructions: HTML, JavaScript, and CSS 210. The one or more computers in web infrastructure 205 may, but need not, be owned or managed by one or more independent entities and may span across one or more computer networks.

A server computer may be a computer that receives requests for data and responds with data. For example, a web server computer may be an HTTP-based computer that receives HTTP requests and responds with data comprising HTML, CSS, or JavaScript instructions. Additionally, or alternatively, a server computer may respond with data that references data on other server computers in, or outside of, web infrastructure 205.

3.2 Intermediary Computer

Intermediary computer 230 may be an intermediary that may receive instructions sent from web infrastructure 205, process or execute one or more of the received instructions, modify the received instructions, or generate or add new instructions. Intermediary computer 230 may send the received instructions, the modified instructions, or new instructions to a client computer using one or more protocols. For example, intermediary computer 230 may receive HTML, JavaScript, and CSS 210, generate modified HTML, JavaScript, and CSS 290 by adding detection instructions, and send modified HTML, JavaScript, and CSS 290 to browser 295 using a HyperText Transfer Protocol ("HTTP").

Intermediary computer 230 may receive a request from browser 295, classify browser 295 as a one or more types of browser or into a one or more browser groups, apply one or more rules to the request based on the classification of browser 295. For example, and as discussed in detail further herein, a rule may cause intermediary computer 230 to generate a new or modified request, and send the new or modified request to web infrastructure 205 using one or more protocols. Also for example, and as discussed in detail further herein, a rule may cause intermediary computer 230 to terminate a request without generating a new request or forwarding the request to web infrastructure 205.

Intermediary computer 230 may be a server computer that one or more domain name servers or other elements of the domain name system ("DNS") identify in DNS records as a destination network address associated with one or more internet domain names. Accordingly, intermediary computer 230 or intermediary computer 230 may receive requests sent to the one or more domains from a browser or bot. Based on using DNS to resolve the domain name in a request to a network address, intermediary computer 230 may forward the request, or a modified request, to a server computer in web infrastructure 205.

In an embodiment, web infrastructure 205 may receive requests from browsers, such as browser 295, forward the requests to intermediary computer 230 for analysis. Intermediary computer 230 may return the request to web infrastructure 205 with data indicating that the request was sent by a browser that was classified as a bot, a legitimate browser, or one or more other types of browsers. Additionally, or alternatively, intermediary computer 230 may apply one or more rules associated with one or more types of browsers or browser groups. For purposes of illustrating a clear example, assume the following:

- Intermediary computer 230 receives a first request from web infrastructure 205 that was originally received from a first web browser;
- Intermediary computer 230 receives a second request from web infrastructure 205 that was originally received from a second web browser;
- Intermediary computer 230 determines that the first browser is a malicious bot in a first browser group based on the first request;
- Intermediary computer 230 determines that the second browser in a second browser group that is used by legitimate users based on the second request;
- Intermediary computer 230 has a first rule associated with the first browser group indicating that intermediary computer 230 should return data to web infrastructure 205 indicating that a request from a browser in the first browser group is malicious;
- Intermediary computer 230 has a second rule associated with the second browser group indicating that intermediary computer 230 should return data to web infrastructure 205 indicating that a request from a browser in the second browser group is legitimate.

Accordingly, in response to determining that the first browser is in the first browser group, intermediary computer 230 may return data, to web infrastructure 205, indicating that the first request is malicious. In an embodiment, intermediary computer 230 may forward the first request to web infrastructure 205 with data in the header of the first request indicating that the first request is malicious. In response to determining that the second browser is in the second browser group, intermediary computer 230 may return data, to web infrastructure 205, indicating that the second request is legitimate. In an embodiment, intermediary computer 230 may forward the forwarded second request to web infrastructure 205 with data in the header of the forwarded second request indicating that the second request is legitimate. As discussed further herein, a browser may be associated with one or more browser groups, and a browser group may be associated with one or more rules.

FIG. 3 illustrates a detailed view of an intermediary computer in an example embodiment. In FIG. 3, intermediary computer 230 comprises protocol client logic 332, processing logic 334, injection logic 336, protocol server logic 338, browser group classification logic 340, and request processor logic 342. In an embodiment, each functional unit or "logic" may be hardware or software comprising a set of computer executable instructions, which when executed by a computer, cause the computer to perform one or more of the functions or operations discussed herein. In FIG. 3, intermediary computer 230 comprises more than one functional unit or logic executed on the same computer. In an embodiment, one or more functional units may be part of the same logic, software module, or package. In an embodiment, one or more of the functional units may be executed on one or computer computers working in concert and communicatively coupled over one or more computer networks. In an embodiment, each of the functional units of intermediary computer 230 may be implemented using any of the techniques further described herein in connection with FIG. 7; for example, the intermediary computer 230 may comprise a general-purpose computer configured with one or more stored programs which when executed cause performing the functions described herein for the intermediary computer, or a special-purpose computer with digital logic that is configured to execute the functions, or digital logic that is used in other computing devices. While the figures include lines that indicate various devices or modules being communicatively coupled, each of the computers, devices, modules, storage, and configurations may be communicatively coupled with each other.

3.2.1 Protocol Client Logic

Protocol client logic 332 may receive data over any standard or proprietary protocol, like a client browser. For example, protocol client logic 332 may receive data, such as web page, over HTTP, from web infrastructure 205. Protocol client logic 332 may send the data, which may comprise one or more instructions, to processing logic 334. Additionally, or alternatively, protocol client logic 332 may bypass processing logic 334 or injection logic 336, and send data from web infrastructure 205 to injection logic 336 or protocol server logic 338.

3.2.2 Processing Logic

Processing logic 334 may process instructions received by protocol client logic 332. Processing one or more instructions may comprise parsing or executing the one or more instructions. Accordingly, processing logic 334 may generate one or more data structures in memory that represent, or correspond to, one or more objects in a web page received from protocol client logic 332. After processing the instructions, processing logic 334 may notify injection logic 336 to begin rendering instructions based on the one or more data structures created by processing logic 334 that are currently in memory. In an embodiment, processing logic 334 may bypass injection logic 336 and send instructions from protocol client logic 332 to protocol server logic 338.

Processing logic 334 may make requests for additional data. For example, if instructions received from protocol client logic 332 reference additional instructions stored on another web server computer, then processing logic 334 may request the additional instructions through protocol client logic 332.

3.2.3 Injection Logic

One or more rules may be associated with each browser group defined by browser group classification logic 340 (discussed further herein). Based on the browser group(s) that a browser is classified into, injection logic 336 may apply the one or more rules associated with the browser group(s) to data received from web infrastructure 205 for the browser. For purposes of illustrating a clear example, assume the following:

- Browser group classification logic 340 classifies browser 295 into a browser group associated with malicious bots and associated with a rule to inject one more particular countermeasures in response to requests from browsers in this browser group;
- Browser group classification logic 340 determines that browser 295 is in the browser group based on a request from browser 295.

In response to the request, injection logic 336 may send a set of countermeasure instructions to browser 295 that comprise the one or more particular countermeasures. Injection logic 336 may send the set of countermeasure to browser 295 with or without a set of instructions from web infrastructure 205. Countermeasure instructions may be one or more instructions that are a countermeasure, such as fake data or a set of browser-executable instructions that cause browser 295 to enter into an infinite loop.

Injection logic 336 may inject one or more browser detection instructions into a web page, which when executed cause the browser to perform one or more operations and send results back to intermediary computer 230. Injection logic 336 may inject one or more browser detection instructions into a web page based on the one or more data structures in memory, data in configuration 232 or storage 240, or on how, or whether, a browser on a client computer responds, or does not respond, to the browser detection instructions. Injecting or adding instructions into a web page may mean prepending, inserting, or appending instructions into the web page or file. Additionally, or alternatively, injecting instructions into a web page may mean generating one or more new files with the new instructions and prepending, inserting, or appending one or more references to the one or more new files in one or more files that originally defined the web page.

Injection logic 336 may send or store data in browser group classification logic 340 or storage 240 indicating which detection tests or instructions were sent to each browser or client computer or which responses to expect from each browser or client computer. Injection logic 336 may send or store data in storage 240 indicating which countermeasures were sent to each browser or client computer.

Additionally or alternatively, injection logic 336 may operate on the objects created by processing logic 334 and inject countermeasure instructions, which if executed are configured to cause a browser to perform or overcome one or more countermeasures, such as polymorphism, dynamic credentials, or any countermeasure discussed in U.S. application Ser. No. 14/099,437, filed on Dec. 6, 2013, U.S. application Ser. No. 14/159,374, filed on Jan. 20, 2014, U.S. application Ser. No. 14/175,923, filed on Feb. 7, 2014, U.S. application Ser. No. 14/218,598, filed on Mar. 18, 2014, U.S. application Ser. No. 14/290,805, filed on May 29, 2014, U.S. application Ser. No. 14/290,835, filed on May 29, 2014, U.S. application Ser. No. 14/338,207, filed on Jul. 22, 2014, U.S. Provisional Application Ser. No. 61/600,145, filed on Feb. 17, 2012, U.S. application Ser. No. 13/527,025, filed on Jun. 18, 2012, U.S. application Ser. No. 14/481,835, filed on Sep. 9, 2014, U.S. application Ser. No. 14/481,867, filed on Sep. 9, 2014, which are incorporated by reference herein.

Injection logic 336 may operate on objects or render instructions based on one or more configurations specified in configuration 232. Injection logic 336 may send the rendered instructions to one or more client computers through protocol server logic 338.

3.2.4 Protocol Server Logic

Protocol server logic 338 may send data or instructions, to client computer browser 295, received from injection logic 336, processing logic 334, protocol client logic 332. Additionally, or alternatively, protocol server logic 338 may receive requests from client computer 299 and forward the requests to browser group classification logic 340, request processor logic 342, or protocol client logic 332.

3.2.5 Browser Group Classification Logic

Browser group classification logic 340 may receive requests from a plurality of client computers or browsers. The requests may be for data, such as a web page, or include one or more explicit or implicit browser identification features, such as an Internet Protocol ("IP") address, user-agent attribute, or results from one or more detection tests.

Browser group classification logic 340 may generate request-feature vectors (discussed further herein) based on the received requests. Browser group classification logic may generate one or more machine learning models (discussed further herein) based on the request-feature vectors and one or more unsupervised or supervised ML algorithms, such as request-feature vector based ML models or cluster-feature based ML models. Browser group classification logic 340 may store, in storage 240, one or more request-feature vectors or machine learning models.

Browser group classification logic 340 may classify browsers into browser groups based on the request-feature vectors associated with the browsers and one or more machine learning models. Browser group classification logic 340 may update the machine learning models based on new request-feature vectors.

3.2.6 Request Processor Logic

One or more rules may be associated with each browser group defined by browser group classification logic 340. Based on the browser group(s) that a browser is classified into, request processor logic 342 may apply the one or more rules associated with the browser group(s) to one or more requests from the browser.

Request processor logic 342 may translate requests received by protocol server logic 338, which may be based on instructions generated by injection logic 336, into requests that would have been generated by browser 295 had browser 295 received the original instructions sent from web infrastructure 205. For example, if a request from browser 295 includes a result from a detection test, then request processor logic 342 may generate a new request that does not include the result from the detection test. Request processor logic 342 may send the new request web infrastructure 205 through protocol client logic 332 on behalf of browser 295.

3.2.7 Configurations

Configuration 242 may be a database, a configuration file, or any other system that stores one or more configurations, settings, preferences, or protocols. Configuration 242 may store more than one configuration for one or more web servers in web infrastructure 205.

Configuration 232 may be modified by a user or administrator through one or more computers, such as intermediary computer 230, a computer in web infrastructure 205, a client computer, or any other computer not illustrated in FIG. 3. The one or more computers may present the user with an interface that presents clusters or browser groups identified by browser group classification logic 340 or one or more other users or systems. A user may create, through the interface, rules stored in configuration 232, and assign one or more rules associated with one or more server computers or domains in web infrastructure 205 to each browser group identified by browser group classification logic 340 or stored in storage 240. Accordingly, a browser group may have a first rule associated with a first web site or domain in web infrastructure 205 and a particular browser group, and a second rule associated a second web site or domain in web infrastructure 205 and the particular browser group. Intermediary computer 230 may apply the first rule to a request received from a browser in the particular browser group if the request is directed toward the first website or domain. However, intermediary computer 230 may apply the second rule to a request received from a browser in the particular browser group if the request is directed toward the second website or domain.

A user, through the interface, may do one or more of the following:

- Create one or more browser groups;
- Assign one or more rules to one or more browser groups;
- Associate or assign one or more browser groups to one or more clusters;
- Dissociate one or more browser groups from one or more clusters.

For purposes of illustrating a clear example, assume that a process using one or more of the unsupervised machine learning methods discussed herein, associated a first browser group with a cluster. A user may determine that a second browser group should be associated with the cluster rather than the first browser group, and in response, dissociate the first browser group from the cluster, and associate a second browser group to the cluster. Furthermore, if the user determines that a third browser group should be associated with the cluster, then the user may associated the third browser group to the cluster through the interface. The user need not disassociate the second browser group from the cluster by associating the third browser group to the cluster.

One or more computers may present the user with an interface that presents the user with a site map. The site map may comprise a graph, wherein the nodes correspond to pages and the edges between the nodes correspond to links. The one or more computers may present the user with an interface that presents the user with a site map. The site map may comprise a graph, wherein the nodes correspond to pages and the edges between the nodes correspond to links. A user may update configuration 232, through the interface, by selecting which links or pages to be "public" and which links or pages are "protected". A public web page may be a web page that need not include one or more detection tests or countermeasures or may be requested by any browser, from any browser group, including a bot. A protected web page may include instructions that perform one or more browser detection tests or countermeasures or may be restricted by the server computer if the server computer has determined that the browser requesting the protected web page is a bot, or has not determined that the browser is a legitimate browser.

3.2.8 Storage

Storage 240 may store data that defines one or more request-feature vector based ML models or cluster-feature based ML models comprising one or more request-feature vectors, cluster-feature vectors, rules, or associations between one or more request-feature vectors, browsers, browser groups, rules. Storage 240 may store one or more expected results from one or more browsers based on one or more browser detection tests sent to the one or more browsers. A browser may be identified, in storage 240, by one or more values or attributes associated with the browser or the client computer that the browser is executed on, such as a Media Access Control ("MAC") address or an IP address assigned to the client computer.

Storage 240 may be a database, a configuration file, or any other system or data structure that stores data. In FIG. 2, storage 240 is illustrated as if a separate computer from intermediary computer 230. Additionally, or alternatively, storage 240 may be a data structure stored in memory on the one or more computers comprising intermediary computer 230. Additionally, or alternatively, storage 240 may, at least in part, be a data structure stored in shared memory between one or more intermediary computers. Additionally, or alternatively, intermediary computer 230 may, at least in part, be stored in volatile or non-volatile memory. Additionally, or alternatively, storage 240 may be the same storage system or data structure as configuration 232.

3.3 Browser

Browser 295 may be a browser as described herein and executed on a client computer, such as client computer 299. Additionally, or alternatively, browser 295 may be a bot comprising one or more of the components traditionally found in a browser.

4.0 Process Overview

In an embodiment, a server computer may generate one or more request-feature vector based ML models comprising one or more request-feature vectors based on one or more requests from each client computer of a plurality of client computers, automatically generate a plurality of clusters based on the request-feature vectors. For each cluster in the plurality of clusters, the server computer may assign one or more browser groups to the cluster. Each browser group may be assigned one or more rules. For a new request from a particular browser, the server computer may determine that the particular browser belongs to one or more browser groups. For each browser group of the one or more browser groups, the server computer may apply, to the new request, one or more rules associated with the browser group. The server computer may update the one or more request-feature vector based ML models based on the new request or one or more other new requests, one or more cluster-feature based ML models, and one or more machine learning techniques.

4.1 Generating a Plurality of Browser Groups

FIG. 4 illustrates a process for generating and using a request-feature vector based ML model based on a plurality of requests from a plurality of browsers, in an example embodiment. In step 410, a server computer receives a plurality of requests from a plurality of client computers. For example, browser group classification logic 340, through protocol server logic 338, in intermediary computer 230, may receive a plurality of requests from a plurality of browsers. The plurality of browsers may be executing on one or more client computers. The plurality of browsers may, but need not, include browser 295. However, for purposes of illustrating clear examples, assume that browser 295 is not among the plurality of browsers.

4.1.1 Representing Browsers Using Request-Feature Vectors

In step 420, the server computer generates a plurality of request-feature vectors from the plurality of requests. For example, browser group classification logic 340 may generate a plurality of request-feature vectors based on the plurality of requests received in step 410. Each request-feature vector, of the plurality of request-feature vectors, may include elements based on features in, or derived from, one or more requests from a browser. For example, a request-feature vector associated with a browser may include the following elements: the user-agent attribute in one or more requests from the browser, the IP address of the client computer that is executing the browser, the average number of requests received from the browser per minute, the results of one or more browser detection tests generated by the browser.

A server computer may generate one or more request-feature vectors based on a request from a browser. For example, browser group classification logic 340 may receive a request from a browser on a client computer that identifies a user-agent attribute, the IP address of the client computer, and the result of a browser detection test. Browser group classification logic 340 may generate a first request-feature vector comprising the IP address or the user-agent attribute, and a second request-feature vector comprising the user-agent attribute or the result of the browser detection test.

As discussed herein there are many browsers and types of browsers, some of which may use or include one or more components in common, or use one or more different components. Accordingly, a particular browser may give the same set of responses to a first set of detection tests as one or more other browsers. However, the particular browser, for a second set of detection tests, may give a different set of responses than the one or more other browsers. Accordingly, a request-feature vector generated from one or more requests from a browser may be used to identify the browser. Each element or feature in the request-feature vector may represent data received in, or derived from, the one or more requests from the browser.

4.1.2 Identifying Browser Clusters

A cluster may comprise one or more request-feature vectors, each of which are associated with one or more browsers. Accordingly, each cluster of the plurality of clusters may be used to identify one or more browsers or types of browser.

Figure 6:
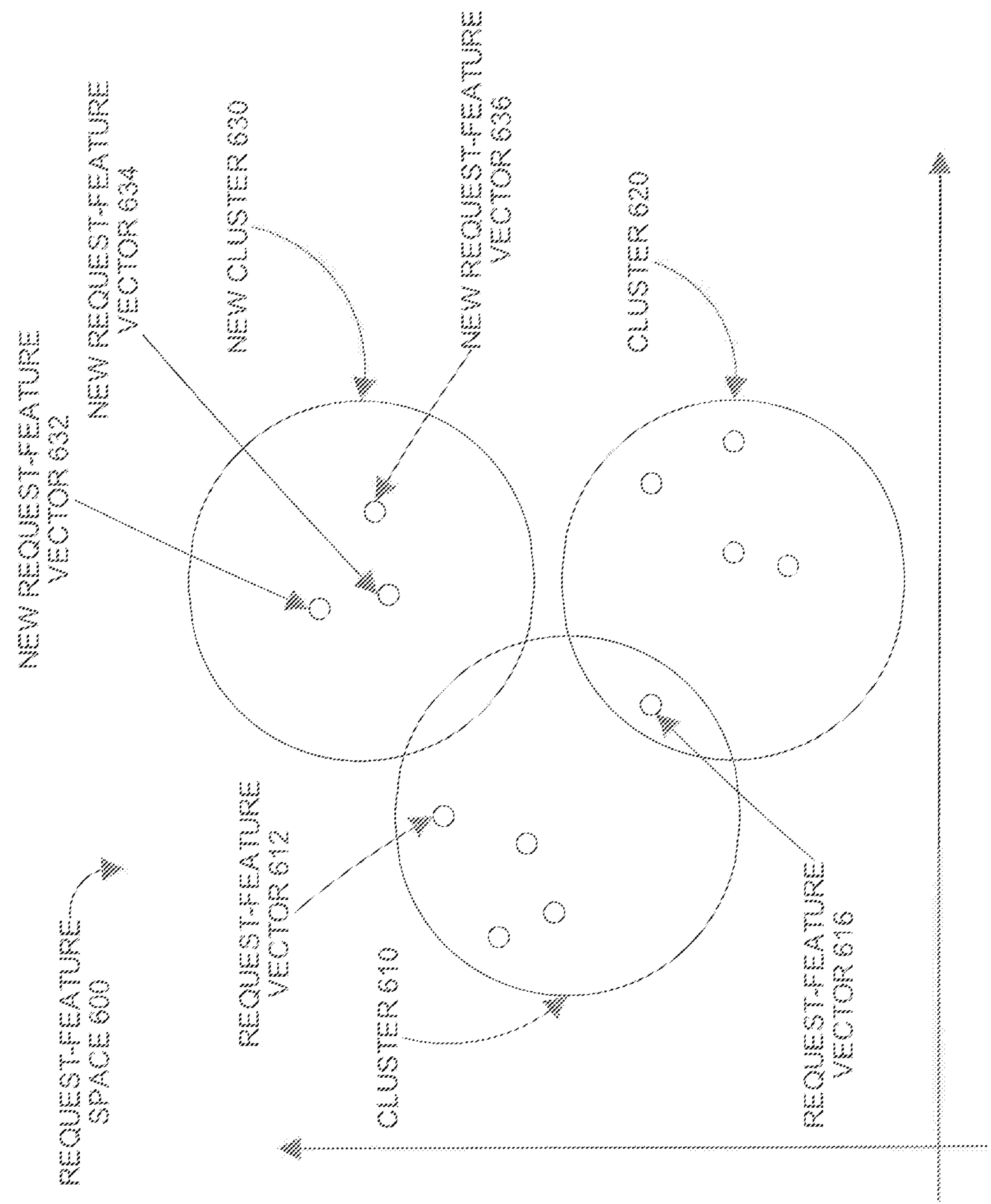
FIG. 6 illustrates a plurality clusters identified from a plurality of request-feature vectors in a feature space, in an example embodiment

FIG. 6 illustrates a plurality of clusters identified from a plurality of request-feature vectors in a feature space, in an example embodiment. In FIG. 6, a plurality of two-dimensional request-feature vectors, such as request-feature vector 612 and request-feature vector 616, are defined within request-feature space 600. A request-feature space can comprise of one or more dimensions. However, for purposes of illustrating clear examples herein, request-feature space 600 and the request-feature vectors illustrated in FIG. 6 are two-dimensional.

Returning to FIG. 4, in step 430, the server computer generates a plurality of clusters based on the plurality of request-feature vectors. For purposes of illustrating a clear example, assume the following:

- Browser group classification logic 340 receives a plurality of requests from a plurality of browsers;
- Browser group classification logic 340 generates a plurality of request-feature vectors based on the plurality of requests;
- The plurality of request-feature vectors includes the request-feature vectors in request-feature space 600, excluding new request-feature vector 632, new request-feature vector 634, and new request-feature vector 636.

Browser group classification logic 340 may partition the plurality of request-feature vectors into a plurality of clusters based on one or more algorithms, which generates data that defines cluster 610 and cluster 620. Cluster 610 includes a first plurality of request-feature vectors, including request-feature vector 612, and request-feature vector 616. Cluster 620 includes a second plurality of request-feature vectors, including request-feature vector 616. As illustrated in this example, a request-feature vector may belong to one or more clusters. A cluster may be a sub-cluster of another cluster. Accordingly, a first browser group associated with a sub-cluster may be a sub-browser group of a second browser group associated with a cluster that comprises the sub-cluster. A request-feature vector may belong to one or more clusters. In an embodiment, clusters may be exclusive; accordingly, a request-feature vector may belong to a single cluster. The one or more algorithms may be, among other algorithms, clustering algorithms, such as k-means, DBScan, or HDB Scan.

4.1.3 Associating Browser Groups with Clusters

There are many ways to associate browser groups with clusters. For example, storage 240 may have a plurality of request-feature vectors that have been assigned to one or more browser groups. For each cluster, browser group classification logic 340 may assign one or more browser groups to the cluster based on the number of request-feature vectors in the cluster that match request-feature vectors in storage 240 that are associated with the one or more browser groups. For purposes of illustrating a clear example, assume the following:

- Storage 240 includes a first set of request-feature vectors associated with a first browser group;
- Storage 240 includes a second set of request-feature vectors associated with a second browser group.

Browser group classification logic 340 may determine that a first number of request-feature vectors in cluster 610 match request-feature vectors in the first set of request-feature vectors associated with the first browser group, a second number of request-feature vectors in cluster 620 match request-feature vectors in the second set of request-feature vectors associated with the second browser group. The first number may be zero, one, or more. The second number may be zero, one, or more. In response to determining that the first number is greater than the second number, browser group classification logic 340 may associate cluster 610 with the first browser group. Additionally, or alternatively, if the first number is greater than a particular threshold, then browser group classification logic 340 may associate cluster 610 with the first browser group. If the second number is greater than the particular threshold, then browser group classification logic 340 may associate cluster 610 with the second browser group. Accordingly, if the first number and the second number are greater than the threshold, then browser group classification logic 340 may associate cluster 610 with the first browser group and the second group.

When a browser group is associated or dissociated with a cluster, browser group classification logic 340 may update the machine learning model. Continuing with the current example, in response to receiving input that the first browser group is not associated with the cluster or the second browser group is associated the cluster, browser group classification logic 340 may update the machine learning model using one or more of the systems or methods discussed herein.

For each cluster, browser group classification logic 340 may assign one or more browser groups to the cluster based on a ratio of request-feature vectors in the cluster that are also in request-feature vectors in storage 240 that are associated with the one or more browser groups. For purposes of illustrating a clear example, assume the following:

- Cluster 610 comprises a total number of request-features vectors;
- Storage 240 includes a first set of request-feature vectors associated with a first browser group;
- Storage 240 includes a second set of request-feature vectors associated with a second browser group.

Browser group classification logic 340 may determine that a first number of request-feature vectors in cluster 610 match request-feature vectors in the first set of request-feature vectors associated with the first browser group, a second number of request-feature vectors in cluster 620 match request-feature vectors in the second set of request-feature vectors associated with the second browser group. Browser group classification logic 340 may determine a first ratio by dividing the first number by the total number. Browser group classification logic 340 may determine a second ratio by dividing the second number by the total number. The first number may be zero, one, or more. The second number may be zero, one, or more. In response to determining that the first ratio is greater than the second ratio, browser group classification logic 340 may associate cluster 610 with the first browser group. Additionally, or alternatively, if the first ratio is greater than a particular threshold, then browser group classification logic 340 may associate cluster 610 with the first browser group. If the second ratio is greater than the particular threshold, then browser group classification logic 340 may associate cluster 610 with the second browser group. Accordingly, if the first ratio and the second ratio are greater than the threshold, then browser group classification logic 340 may associate cluster 610 with the first browser group and the second group.

In one or more of the examples above, a cluster may be associated with one or more browser groups. Additionally, or alternatively, a browser group may be associated with one or more clusters. For example, cluster 610 may be associated with one or more particular browser groups using one or more systems or methods discussed herein, and cluster 620 may be associated with the one or more particular browser groups using one or more systems or methods discussed herein. Additionally, or alternatively, cluster 610 may be associated with a browser group that is not associated with cluster 620. Additionally, or alternatively, if cluster 610 and cluster 620 are assigned the same browser groups, and neither cluster 610 nor cluster 620 is associated with a browser group that is not associated with both cluster 610 and cluster 620, then cluster 610 and cluster 620 may be merged to become a single cluster.

4.2 Classifying a New Browser into a Browser Group Based on a New Request

Returning to FIG. 4, in step 440, the server computer receives a new request from a browser on a client computer. For example, browser group classification logic 340 receives a first new request from browser 295 executing on client computer 299.

In step 450, the server computer generate a new request-feature vector based on the new request. For purposes of illustrating a clear example, assume the following:

- The new request received in step 440 comprises a first user-agent identifier and a first result from a browser detection test; and
- Cluster 610 and cluster 620 have been defined, but cluster 630 has not been created yet.

Browser group classification logic 340 may generate a new request-feature vector, illustrated in request-feature space 600 as new request-feature vector 632. Request-feature vector 632 comprises a first feature that identifies the user-agent identified in the request and the output from the browser detection test. In this example, request-feature vector 632 is two-dimensional or comprised of two elements based on a single request, however a request-feature vector may comprise one or more elements based on one or more requests from a particular browser on a particular client computer, such as the average amount of time between requests from the browser. Additionally, or alternatively, one request-feature vector associated with a first browser may be based on a different number of requests than another request-feature vector associated with a second browser. Additionally, or alternatively, one request-feature vector associated with a first browser may include a feature that another request-feature vector associated with a second browser does not include. Additionally, or alternatively, one request-feature vector associated with a first browser may include a different number of features than another request-feature vector associated with a second browser.

In step 460, the server computer determines that the browser belongs to a browser group among the plurality of browser groups based on the new request-feature vector. For example, browser group classification logic 340 may use a nearest neighbor approach to determine that new request-feature vector 632 is closer to one or more request-feature vectors in cluster 610 than one or more request-feature vectors in cluster 620. In response, browser group classification logic 340 may classify new request-feature vector 632 as a browser in cluster 610. Accordingly, browser group classification logic 340 may determine that browser 295 belongs to the one or more browser groups associated with cluster 610.

In the example above, browser group classification logic 340 used a nearest neighbor approach to determine that request-feature vector 632 should be classified as, or belongs to, cluster 610. Additionally, or alternatively, browser group classification logic 340 may repartition the plurality of request-feature vectors, which in this example include the request-feature vectors in cluster 610 and cluster 620, and new request-feature vector 632. If cluster 610 is expanded to include new request-feature vector 632, then browser group classification logic 340 may determine that request-feature vector 632 should be classified as, or belongs to, cluster 610. Similarly, if cluster 620 is expanded to include new request-feature vector 632, then browser group classification logic 340 may determine that request-feature vector 632 should be classified as, or belongs to, cluster 620.

4.3 Executing One or More Rules Associated with One or More Browser Groups

In step 470, the intermediary computer may determine that the browser group is associated with a rule, and in response, respond to the new request according to first rule. For purposes of illustrating a clear example, assume the following:

- Browser group classification logic 340 receives a new request from browser 295, and generates new request-feature vector 632;
- Browser group classification logic 340 classifies new request-feature vector 632 into cluster 610;
- A browser group is associated with cluster 610;
- The browser group is labeled as being one or more browsers that are known to be used by legitimate users;
- Configuration 232 has data that defines a first rule that is associated with the browser group;
- The first rule is to translate requests that are received;
- The second rule is to forward the translated request to the intended server computer in web infrastructure 205.

Request processor logic 342 may determine that the first rule and the second rule are associated with the browser group. In response, request processor logic 342 may produce a translated request, which is the request that browser 295 would have sent a server computer in web infrastructure 205 if browser 295 had received instructions that were not modified by injection logic 336. Also in response, request processor logic 342 may send the translated request to the server computer in web infrastructure 205.

As discussed above, a request-feature vector may be classified into more than one browser group. For example, cluster 610 may be associated with more than one browser group. Also for example, request-feature vector 616 is in cluster 610 and cluster 620.

A rule may be assigned a priority, and request processor logic 342 may perform the rule with the higher or highest priority among the rules associated with each browser group that a request-feature vector is in. For purposes of illustrating a clear example, assume the following:

- Browser group classification logic 340 receives a new request from browser 295, and generates new request-feature vector 632;
- Browser group classification logic 340 classifies new request-feature vector 632 into cluster 610;
- A browser group is associated with cluster 610;
- A first rule and a second rule are associated with the browser group;
- The first rule has a first priority and the second rule has a second priority;
- The first priority is higher than the second priority.

Request processor logic 342 may compare the first priority associated with the first rule and the second priority associated with the second rule. If request processor logic 342 determines that the first priority is higher than the second priority, then request processor logic 342 may perform the first rule, but not the second rule. If request processor logic 342 determines that the first priority matches, or is the same as, the second priority, then request processor logic 342 may perform the first rule and the second rule.

Additionally, or alternatively, browser groups may have priorities, and request processor logic 342 may perform the rule(s) associated with the browser group with the higher priority. For purposes of illustrating a clear example, assume the following:

- Browser group classification logic 340 receives a new request from browser 295, and generates request-feature vector 616;
- Browser group classification logic 340 classifies new request-feature vector 616 into cluster 610 and cluster 620;
- A first browser group is associated with cluster 610;
- A second browser group is associated with cluster 620;
- The first browser group is associated with a first priority and one or more first rules;
- The second browser group is associated with a second priority and one or more second rules.

Request processor logic 342 may compare the first priority associated with the first browser group and the second priority associated with the second browser group. If request processor logic 342 determines that the first priority is higher than the second priority, then request processor logic 342 may perform the one or more first rules associated with the first browser group, but not the one or more second rules associated with the second browser group. If request processor logic 342 determines that the first priority matches, or is the same as, the second priority, then request processor logic 342 may perform the one or more first rules associated with the first browser group and the one or more second rules associated with the second browser group.

4.4 Updating the Machine Learning Model

In step 480, the server computer updates the machine learning model. Intermediary computer 230 may use one or more methods to update the machine learning model. Each method may be performed at different times. For purposes of illustrating a clear example, assume the following:

- Browser group classification logic 340 receives a first new request browser 295;
- Browser group classification logic 340 generates new request-feature vector 632 based on the first new request;
- Browser group classification logic 340 has identified cluster 610 and cluster 620 in request-feature space 600, but has not yet identified new cluster 630;
- Browser group classification logic 340 classifies new request-feature vector 632 as being within cluster 610.

In response to classifying new request-feature vector 632 as being within cluster 610, browser group classification logic 340 may expand cluster 610 to include new request-feature vector 632. In response to a second new request, if browser group classification logic 340 generates a second request-feature vector that matches new request-feature vector 632, then the browser that sent the second new request will be grouped into cluster 610. Accordingly, the browser that sent the second new request will be in the one or more browser groups associated with cluster 610.

4.4.1 Regenerating the Machine Learning Model

Figure 5:
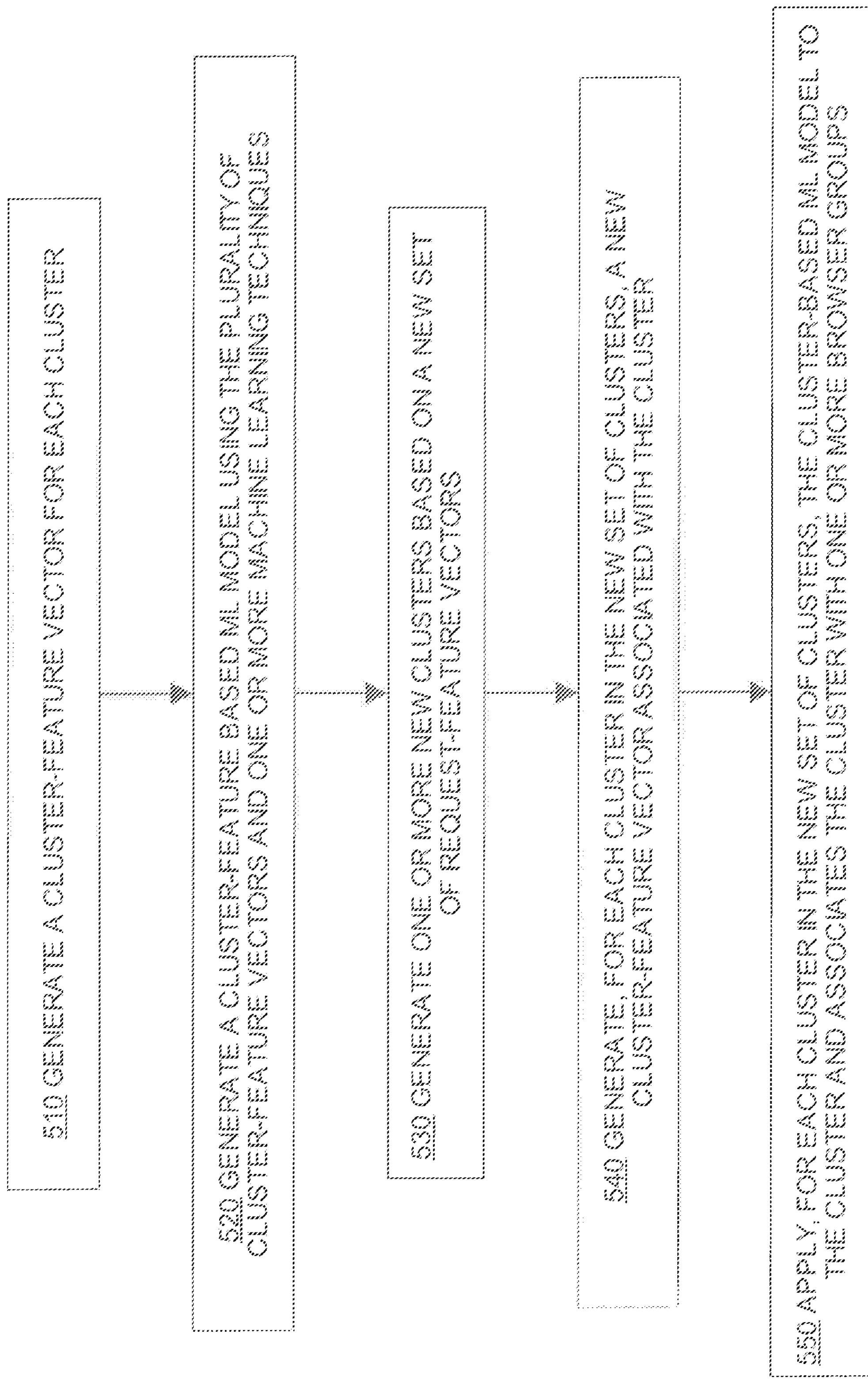
FIG. 5 illustrates a process for regenerating a cluster-feature based ML model, in an example embodiment

After receiving or processing a one or more new requests, the server computer may update the machine learning model by regenerating the machine learning model. The server computer may regenerate the machine learning model based on the request-feature vectors and associations between the request-feature vectors and the clusters or browser groups. For example, intermediary computer 230 may perform steps 410 through 430, then repeat steps 440 through 470 for each new request that intermediary computer 230 receives, and after a particular number of requests are received or after a particular period of time, intermediary computer 230 may perform step 480. In an embodiment, browser group classification logic 340 may generate a cluster-feature based ML model. FIG. 5 illustrates a process for regenerating a cluster-feature based ML model, in an example embodiment.

4.4.2 Generating Cluster-Feature Vectors

In step 510, the server computer generates a cluster-feature vector for each cluster. A cluster-feature vector is associated with a cluster and may have one or more elements based on the request-feature vectors associated with the cluster. For purposes of illustrating a clear example, assume the following:

- Browser group classification logic 340 generated a first request-feature vector based ML model that includes cluster 610 and cluster 620, and the request-feature vectors in cluster 610 or cluster 620;
- In the first request-feature vector based ML model, cluster 610 is associated with a first browser group;
- In the first request-feature vector based ML model, cluster 620 is associated with a second browser group;
- Each request-feature vector in the first request-feature vector based ML model identifies a user-agent and one or more web pages that were requested.

Browser group classification logic 340 may generate a first cluster-feature vector with features or elements based on the request-feature vector(s) in cluster 610 and a second cluster-feature vector with features or elements based on the request-feature vector(s) in cluster 620. For purposes of illustrating a clear example, assume the following:

- The first cluster-feature vector is <X1, Y1, Z1> and the second cluster-feature vector is <X2, Y2, Z2>.
- X1 indicates the number of times that a request-feature vector in cluster 610 identifies a first user-agent;
- Y1 indicates the number of times that a request-feature vector in cluster 610 identifies a first particular web page that was requested;
- Z1 indicates the number of times that a request-feature vector in cluster 610 identifies a second particular web page that was requested;
- X2 indicates the number of times that a request-feature vector in cluster 620 identifies the first user-agent;
- Y2 indicates the number of times that a request-feature vector in cluster 620 identifies the first particular web page that was requested;
- Z2 indicates the number of times that a request-feature vector in cluster 620 identifies the second particular web page that was requested.

For each cluster-feature vector, and the cluster-feature vector's corresponding cluster, browser group classification logic 340 may associate the cluster-feature vector with the one or more browser groups associated the corresponding cluster. Accordingly, in this example, browser group classification logic 340 may associate the first cluster-feature vector with the first browser group and the second cluster-feature vector with the second browser group.

4.3.3 Generating a Cluster-Feature Vector Based Machine Learning Model

In step 520, the server computer generates a cluster-feature based ML model using the plurality of cluster-feature vectors and one or more machine learning techniques. Continuing with the previous example, browser group classification logic 340 may use logistic regression to generate cluster-feature based ML model comprising a set of coefficient vectors based on the first cluster-feature vector, the second cluster-feature vector, the association between the first cluster-feature vector and the first browser group, and the association between the second cluster-feature vector. Each coefficient vector in the set of coefficient vectors may be associated with a threshold and browser group. For purposes of illustrating a clear example, assume the following:

- The set of coefficient vectors comprise a first coefficient vector associated with the first browser group and a second coefficient vector associated with second browser group;
- The threshold associated with each coefficient vector in the set of coefficient vectors is zero.

Each threshold may be selected algorithmically, selected by a user, or be a constant. In this example, browser group classification logic 340 used a logistic regression. Additionally, or alternatively, browser group classification logic 340 may use a support vector machine, gradient boosting tree, or other machine learning algorithm to generate a cluster-feature based ML model that maps each cluster in a set of clusters to one or more browser groups.

4.4.4 Applying the Cluster-Feature Vector Based Machine Learning Model to a New Set of Clusters In step 530, the server computer generates one or more new clusters based on a new set of request-feature vectors. For purposes of illustrating a clear example, assume the following:

- Browser group classification logic 340, since generating the first request-feature vector based ML model, received a plurality of new requests;
- In response, browser group classification logic 340 generated new request-feature vector 632, new request-feature vector 634, and new request-feature vector 636.

Browser group classification logic 340 may identify cluster 610, cluster 620, and new cluster 630 using one or more of the methods discussed herein. In this example, cluster 610 and cluster 620 were identified again by browser group classification logic 340. However, browser group classification logic 340 need not identify the same clusters.

In step 540, the server computer generates, for each cluster in the new set of clusters, a new cluster-feature vector associated with the cluster. For example, using one or more of the features discussed herein, browser group classification logic 340 may generate a first new cluster-feature vector associated with cluster 610 based on the request-feature vectors in cluster 610, a second new cluster-feature vector associated with cluster 620 based on the request-feature vectors in cluster 620, and a third cluster-feature vector associated with cluster 630 based on the request-feature vectors in cluster 610 using one or more of the methods discussed herein.

In step 550, the server computer applies, for each cluster in the new set of clusters, the cluster-feature based ML model to the cluster and associates the cluster with one or more browser groups. Continuing with the current example, for each coefficient vector in the set of coefficient vectors, browser group classification logic 340 applies the coefficient vector to each cluster-feature vector associated with a new cluster and produces a value. If the value generated from applying a particular coefficient vector to a particular cluster-feature vector is greater than the threshold that corresponds with the particular coefficient vector, then browser group classification logic 340 may associate the browser group associated with the particular coefficient vector to the cluster associated with the particular cluster-feature vector. To illustrate a clear, more detailed example, assume the following:

- The first coefficient vector comprises <C1, C2, C3>, and is associated with a first threshold and the first browser group;
- The second coefficient vector comprises <C4, C5, C6>, and is associated with a second threshold and the second browser group;
- A first new cluster-feature vector comprises <F1, F2, F3>, and is associated with cluster 610;
- A second new cluster-feature vector comprises <F4, F5, F6>, and is associated with cluster 620;
- A third new cluster-feature vector comprises <F7, F8, F9>, and is associated with new cluster 630;

In this example, each coefficient vector is associated with a threshold. However, in an embodiment, one or more coefficient vectors may be associated with the same threshold. Accordingly, in an embodiment, the first threshold and the second threshold may be the same threshold or a global threshold that is used with all coefficient vectors. In an embodiment, the first threshold and the second threshold may be a different threshold.

Browser group classification logic 340 may apply the first coefficient vector to the first new cluster-feature vector using the following value, V1:

$$V1=C1*F1+C2*F2+C3*F3.$$

If V1 is greater than the first threshold, then browser group classification logic 340 may associate the first browser group with cluster 610.

Browser group classification logic 340 may apply the second coefficient vector to the first new cluster-feature vector using the following value, V2:

$$V2=C4*F1+C5*F2+C6*F3.$$

If V2 is greater than the second threshold, then browser group classification logic 340 may associate the second browser group with cluster 610.

Browser group classification logic 340 may apply the first coefficient vector to the second new cluster-feature vector using the following value, V3:

$$V3=C1*F4+C2*F5+C3*F6.$$

If V3 is greater than the first threshold, then browser group classification logic 340 may associate the first browser group with cluster 620.

Browser group classification logic 340 may apply the second coefficient vector to the second new cluster-feature vector using the following value, V4:

$$V4=C4*F4+C5*F5+C6*F6.$$

If V4 is greater than the second threshold, then browser group classification logic 340 may associate the second browser group with cluster 620.

Browser group classification logic 340 may apply the first coefficient vector to the third new cluster-feature vector using the following value, V5:

$$V5=C1*F7+C2*F8+C3*F9.$$

If V5 is greater than the first threshold, then browser group classification logic 340 may associate the first browser group with cluster 630.

Browser group classification logic 340 may apply the second coefficient vector to the third new cluster-feature vector using the following value, V6:

$$V6=C4*F7+C5*F8+C6*F9.$$

If V6 is greater than the second threshold, then browser group classification logic 340 may associate the second browser group with cluster 630.

The new, second request-feature vector based ML model comprises the resulting clusters with the associated browser groups. In response to browser group classification logic 340 receiving a new request from a browser, browser group classification logic 340 may generate a new request-feature vector, determine which cluster(s) among the new set of clusters the new request-feature vector belongs to, determine the browser group(s) that are associated with the cluster(s), and apply the rule(s) associated with the browser group(s) to the request according to one or more of the methods discussed herein.

5.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired or program logic to implement the techniques.

Figure 7:
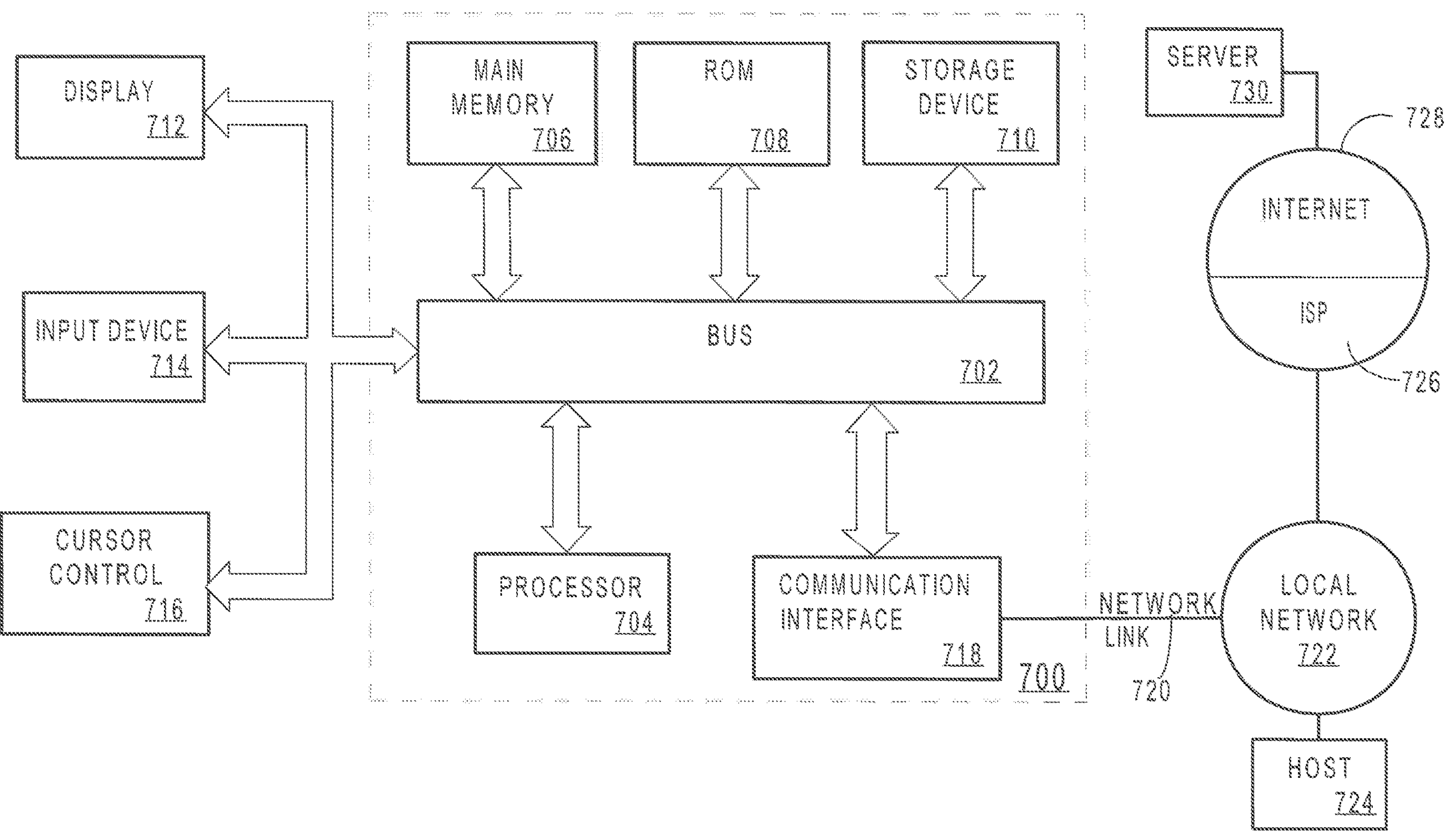
FIG. 7 illustrates a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, or stored in storage device 710, or other non-volatile storage for later execution.

6.0 OTHER ASPECTS OF DISCLOSURE

Using the networked computer arrangements, intermediary computer, or processing methods described herein, security in client-server data processing may be significantly increased. Polymorphic techniques discussed herein effectively reduce automated attacks. Consequently, one or more various attacks, such as a denial of service ("DOS") attack, credential stuffing, fake account creation, ratings or results manipulation, man-in-the-browser attacks, reserving rival goods or services, scanning for vulnerabilities, or exploitation of vulnerabilities, are frustrated because object identifiers or polymorphic hooks may change over time.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A network security system comprising one or more intermediary computing devices, client devices, or server devices with a memory comprising programmed instructions stored thereon and one or more processors coupled to the memory and configured to be capable of executing the stored programmed instructions to:

generate a plurality of request-feature vectors from a plurality of requests received from a plurality of browsers, wherein each of the request-feature vectors comprises an element generated based on a feature of one the requests;

associate each of a plurality of browser groups to one or more clusters generated based on an application of a clustering algorithm to determine a number of times each of the plurality of request-feature vectors matches existing request feature vectors associated with each of the browser groups in each of the clusters above a threshold to establish the association, wherein two or more of the clusters which have the same associated browser groups are merged into a single cluster;

generate a new request-feature vector based at least in part on another feature extracted from a new request received from another browser;

identify one of the clusters to which the new request-feature vector belongs based on a proximity of the new request-feature vector to at least one of the request-feature vectors in a request-feature space; and apply a rule associated with one of the browser groups to process the new request, wherein the one of the browser groups is associated to the one of the clusters.

2. The network security system of claim 1, wherein the new request-feature vector is different from each of the plurality of request-feature vectors.

3. The network security system of claim 1, wherein the one or more processors are further configured to execute the stored programmed instructions to determine that the one of the one or more rules has a higher associated priority than another one of the rules.

4. The network security system of claim 1, wherein the clustering algorithm comprises a k-means clustering algorithm, a density-based spatial clustering of applications with noise (DBSCAN) algorithm, or a hierarchical DBSCAN (HDBSCAN) algorithm.

5. The network security system of claim 1, wherein the new request-feature vector is determined to belong to the one of the clusters based on an application of a nearest neighbor algorithm and the one or more processors are further configured to execute the stored programmed instructions to add the new request-feature vector to the one of the clusters.

6. An intermediary computing device, comprising memory comprising programmed instructions stored thereon and one or more processors configured to be capable of executing the stored programmed instructions to:

generate a plurality of request-feature vectors from a plurality of requests received from a plurality of browsers, wherein each of the request-feature vectors comprises an element generated based on a feature of one the requests;

associate each of a plurality of browser groups to one or more clusters generated based on an application of a clustering algorithm to determine a number of times each of the plurality of request-feature vectors matches existing request feature vectors associated with each of the browser groups in each of the clusters above a threshold to establish the association, wherein two or more of the clusters which have the same associated browser groups are merged into a single cluster;

generate a new request-feature vector based at least in part on another one or more features extracted from a new request received from a browser;

identify one of the clusters to which the new request-feature vector belongs based on a proximity of the new request-feature vector to at least one of the request-feature vectors in a request-feature space; and apply a rule associated with one of the browser groups to process the new request, wherein the one of the browser groups is associated with the one of the clusters.

7. The intermediary computing device of claim 6, wherein the new request-feature vector is different from each of the request-feature vectors.

8. The intermediary computing device of claim 6, wherein the one or more processors are further configured to be capable of executing the stored programmed instructions to determine that the one of the one or more rules has a higher associated priority than another one of the rules.

9. The intermediary computing device of claim 6, wherein the clustering algorithm comprises a k-means clustering algorithm, a density-based spatial clustering of applications with noise (DBSCAN) algorithm, or a hierarchical DBSCAN (HDBSCAN) algorithm.

10. The intermediary computing device of claim 6, wherein the new request-feature vector is determined to belong to the one of the clusters based on an application of a nearest neighbor algorithm and the one or more processors are further configured to be capable of executing the stored programmed instructions to add the new request-feature vector to the one of the clusters.

11. A non-transitory computer readable medium having stored thereon instructions for web browser classification comprising executable code that, when executed by one or more processors, causes the one or more processors to:

generate a plurality of request-feature vectors from a plurality of requests received from a plurality of browsers, wherein each of the request-feature vectors comprises an element generated based on a feature of one the requests;

associate each of a plurality of browser groups to one or more clusters generated based on an application of a clustering algorithm to determine a number of times each of the plurality of request-feature vectors matches existing request feature vectors associated with each of the browser groups in each of the clusters above a threshold to establish the association, wherein two or more of the clusters which have the same associated browser groups are merged into a single cluster;

generate a new request-feature vector based at least in part on another one or more features extracted from a new request received from a browser;

identify one of the clusters to which the new request-feature vector belongs based on a proximity of the new request-feature vector to at least one of the request-feature vectors in a request-feature space; and apply a rule associated with one of the browser groups to process the new request, wherein the one of the browser groups is associated with the one of the clusters.

12. The non-transitory computer readable medium of claim 11, wherein the new request-feature vector is different from each of the request-feature vectors.

13. The non-transitory computer readable medium of claim 11, wherein the executable code, when executed by the one or more processors, further causes the one or more processors to determine that the one of the one or more rules has a higher associated priority than another one of the rules.

14. The non-transitory computer readable medium of claim 11, wherein the clustering algorithm comprises a k-means clustering algorithm, a density-based spatial clustering of applications with noise (DBSCAN) algorithm, or a hierarchical DBSCAN (HDBSCAN) algorithm.

15. The non-transitory computer readable medium of claim 11, wherein the new request-feature vector is determined to belong to the one of the clusters based on an application of a nearest neighbor algorithm and the executable code, when executed by the one or more processors, further causes the one or more processors to add the new request-feature vector to the one of the clusters.

16. A web browser classification method implemented by a network security system comprising one or more intermediary computers, client computers, or server computers, the method comprising:

generating a plurality of request-feature vectors from a plurality of requests received from a plurality of browsers, wherein each of the request-feature vectors comprises an element generated based on a feature of one the requests;

associating each of a plurality of browser groups to one or more clusters generated based on an application of a clustering algorithm to determine a number of times each of the plurality of request-feature vectors matches existing request feature vectors associated with each of the browser groups in each of the clusters above a threshold to establish the association, wherein two or more of the clusters which have the same associated browser groups are merged into a single cluster;

generating a new request-feature vector based at least in part on another one or more features extracted from a new request received from a browser;

identifying one of the clusters to which the new request-feature vector belongs based on a proximity of the new request-feature vector to at least one of the request-feature vectors in a request-feature space; and applying a rule associated with one of the browser groups to process the new request, wherein the one of the browser groups is associated with the one of the clusters.

17. The web browser classification method of claim 16, wherein the new request-feature vector is different from each of the request-feature vectors.

18. The web browser classification method of claim 16, further comprising determining that the one of the one or more rules has a higher associated priority than another one of the rules.

19. The web browser classification method of claim 16, wherein the clustering algorithm comprises a k-means clustering algorithm, a density-based spatial clustering of applications with noise (DBSCAN) algorithm, or a hierarchical DBSCAN (HDBSCAN) algorithm.

20. The web browser classification method of claim 16, wherein the new request-feature vector is determined to belong to the one of the clusters based on an application of a nearest neighbor algorithm and the method further comprises adding the new request-feature vector to the one of the clusters.

* * * * *